United States Patent
Martin et al.

(10) Patent No.: US 10,596,488 B1
(45) Date of Patent: Mar. 24, 2020

(54) LITHIUM ION EXTRACTION METHODS

(71) Applicants: Dean F. Martin, Tampa, FL (US); Kirpal Singh Bisht, Tampa, FL (US)

(72) Inventors: Dean F. Martin, Tampa, FL (US); Kirpal Singh Bisht, Tampa, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 16/249,673

(22) Filed: Jan. 16, 2019

Related U.S. Application Data

(60) Provisional application No. 62/618,282, filed on Jan. 17, 2018.

(51) Int. Cl.
 *C22B 26/12* (2006.01)
 *B01D 15/38* (2006.01)
 *B01D 15/20* (2006.01)
 *C08G 73/02* (2006.01)

(52) U.S. Cl.
 CPC ....... *B01D 15/3828* (2013.01); *B01D 15/203* (2013.01); *C22B 26/12* (2013.01); *C08G 73/0206* (2013.01)

(58) Field of Classification Search
 CPC .. B01D 15/00; B01D 15/203; B01D 15/3828; C22B 26/12; C08G 73/0206
 See application file for complete search history.

(56) References Cited

U.S. PATENT DOCUMENTS

| | | | | |
|---|---|---|---|---|
| 3,793,433 A | * | 2/1974 | Seeley et al. | B01D 11/0492 423/179.5 |
| 5,190,660 A | * | 3/1993 | Lindoy | B01J 45/00 210/670 |
| 5,522,996 A | | 6/1996 | Brownstein et al. | |
| 5,914,044 A | * | 6/1999 | Lindoy | B01J 45/00 210/638 |
| 2011/0186522 A1 | | 8/2011 | Martin | |

OTHER PUBLICATIONS

Martin et al. Removal of uranium (VI) from water samples using OCTOLIG, FERRILIG, and THORILIG, metal derivatives of OCTOLIG, a supported chelating agent, Florida Scientist, vol. 71, pp. 208-214. (Year: 2008).*

Minnesota Department of Health, Uranium in community water systems [online] [retrieved on May 30, 2019]. Retrieved from the internet: <URL:https://data.web.health.state.mn.us/uranium-messaging>. (Year: 2019).*
Minnesota Department of Health, Tetrahydrofuran and drinking water, [online] [retrieved on May 30, 2019]. Retrieved from the internet: <https://www.health.state.mn.us/communities/environment/risk/guidance/gw/thfinfo.pdf>. (Year: 2016).*
Huber et al, Relationship between altitude and lithium in groundwater in the United States of America: results of a 1992-2003 study, Geospat Health, vol. 9, Issue 1, pp. 231-235. (Year: 2014).*
Martin, et al. "Removal of selected NSAIDs (nonsteroidal anti-inflammatory drugs) in aqueous samples by Octolig®" J. Environ. Sci. Health, Pt. A., 2016, 51, 186-191.
Martin, et al. "Removal of selected nuisance anions by Octolig®," Journal of Environmental Science and Health, Part A, 2010, 45:9, 1144-1149.
Martin, D. F. "Chromatographic separations with selected supported chelating agents," Column Chromatography; 2013, InTech Europe, Rijeka, Croatia. DOI: 10.5772/55521.
Alessio, et al. "Removal of BPA model compounds and related substances by means of column chromatography using Octolig®," Journal of Environmental Science and Health, Part A, 2012, 47:14, 2198-2204.
Koerner B. I. Energy and genius. The Saudi Arabia of lithium. Forbes, Nov. 24, 2008.
Salvi, et al "Catalytic asymmetric generation of (Z)-disubstituted allylic alcohols." J. Am. Chem. Soc., 2007, 129, 16119-16125.
Stull, et al. "Comparative ease of separation of mixtures of selected anions (nitrate, nitrite, sulfate, phosphate) using Octolig®." J. Environ. Sci. Health., Pt. A, 2009, 44, 1551-1556.
Martin, et al. "Effectiveness of removal of aqueous perchlorate by Cuprilig, a copper(II) derivative of Octolig®" J. Environ. Sci. Health. Pt.A, 2009, 44, 188-191.
Martin, et al. "Removal of synthetic food dyes in aqueous solutions by Octolig®," J. Environ. Sci. Health Pt. A. 2013, 48, 495-500.
Martin, et al. "Removal of pain-relieving drugs from aqueous solutions using Octolig® and metalloligs." J. Environ. Sci. Health, Pt. A., 2015, 50, 788-793.
Paranthaman, et al. "Recovery of lithium from geothermal brine with lithium-aluminum layered double hydroxide chloride sorbants." Environ. Sci. Technol. 2017, 51, 13481-13486.
Schultze, et al. "Operation of a mineral recovery unit on brine from the Salton Sea known geothermal resource area," US Bureau of Mines, Report of Investigations 8680, 1982.

* cited by examiner

Primary Examiner — Matthew O Savage
(74) Attorney, Agent, or Firm — Thomas|Horstemeyer, LLP

(57) ABSTRACT

Described herein are compositions for non-aqueous lithium ion extraction and methods of non-aqueous lithium ion extraction. In some embodiments, Octolig® or a methyl derivative thereof can be used to extract lithium and/or other ions from a non-aqueous substrate.

6 Claims, No Drawings

LITHIUM ION EXTRACTION METHODS

CROSS-REFERENCE TO RELATED APPLICATIONS

This application claims the benefit of and priority to U.S. Provisional Patent Application No. 62/618,282, filed on Jan. 17, 2018, entitled "Conversion of Octolig® to a Lithium-ion Control Agent," the contents of which is incorporated by reference herein in its entirety.

BACKGROUND

Extraction of ions from various sources is important for inter alia, mining, environmental safety, and chemical reactions. Some ions, such a lithium, are more difficult to extract than others. As such there exists a need for additional compositions and techniques for ion extraction.

SUMMARY

Described herein are various embodiments of a method of ion extraction, that can include the steps of contacting a liquid ion source comprising ions with an ion capture substrate in the presence of an organic solvent, wherein the ion capture substrate comprises a plurality of polyethylenediimine moieties or a plurality of polymethylethylenediimine moieties, wherein each of the polyethylenediimine moieties or each of the polymethylethylenediimine moieties are covalently attached to an immobilization substrate. In some embodiments, the ions can be or include lithium. The organic solvent can be selected from the group of acetone, acetonitrile, butanone, 1,2-dichloroethane, diethylene glycol, diglyme (diethylene glycol dimethyl ether), 1,2-dimethoxyethane (DME), dimethyl formamide (DMF), dimethyl sulfoxide (DMSO), dioxane, ethyl acetate, ethylene glycol, methyl t-butyl ether (MTBE), N-methyl-2-pyrrolidinone (NMP), tetrahydrofuran (THF), toluene, and mixtures thereof. In some embodiments, the organic solvent can be tetrahydrofuran. In some embodiments, the polyethylenediimine moieties in the plurality of polyethylenediimine moieties can be according to Formula 1

  Formula 1.

In some embodiments, each polymethylethylenediimine moiety in the plurality of polymethylethylenediimine moieties is according to Formula 2

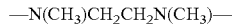  Formula 2.

In some embodiments, the liquid ion source can be non-aqueous. In some embodiments, the organic solvent is a non-aqueous organic solvent. The method can also include, in some embodiments, the step of regenerating the ion capture substrate. In some embodiments, the step of regenerating comprise contacting the ion capture substrate with an acidic solution or a solution comprising a ligand having a greater affinity for an ion captured by the ion capture substrate than the ion capture substrate. In some embodiments, the method is selective for lithium ions. In some embodiments, the ions are or can include lithium and greater than about 90 percent of lithium ions present in the liquid ion source are removed from the liquid ion source. In some embodiments, the method can further include the step of generating the liquid ion source, wherein the step of generating the liquid ion source includes processing a raw ion source material to form the liquid ion source, and wherein the raw ion source can be selected from the group of a suitable water source, a brine pool, a brine deposit, a geothermal brine or well, a battery, a synthetic chemical reaction reagent or product, or a combination thereof.

Also described herein are embodiments of an ion capture substrate that can be composed of a plurality of polymethylethylenediimine moieties, wherein each of the polymethylethylenediimine moieties are covalently attached to an immobilization substrate. In some embodiments, each of the polymethylethylenediimine moieties is according to Formula 2. In some embodiments, the immobilization substrate is a silica gel.

Also described herein are embodiments of a chromatography column that can be composed of a plurality of polymethylethylenediimine moieties, wherein each of the polymethylethylenediimine moieties are covalently attached to an immobilization substrate. In some embodiments, each of the polymethylethylenediimine moieties is according to Formula 2. In some embodiments, the immobilization substrate can be a silica gel. In some embodiments, each of the polymethylethylenediimine moieties is according to Formula 2.

DETAILED DESCRIPTION

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting.

Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, the preferred methods and materials are now described.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant application should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

Where a range is expressed, a further aspect includes from the one particular value and/or to the other particular value. Where a range of values is provided, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used in the specification and the appended claims, the singular forms "a," "an," and "the" include plural referents unless the context clearly dictates otherwise.

As used herein, "about," "approximately," "substantially," and the like, when used in connection with a numerical variable, can generally refers to the value of the variable and to all values of the variable that are within the experimental error (e.g., within the 95% confidence interval for the mean) or within +/−10% of the indicated value, whichever is greater. As used herein, the terms "about," "approximate," "at or about," and "substantially" can mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

Unless stated to the contrary, a formula with chemical bonds shown only as solid lines and not as wedges or dashed lines contemplates each possible isomer, e.g., each enantiomer and diastereomer, and a mixture of isomers, such as a racemic or scalemic mixture. Compounds described herein can contain one or more asymmetric centers and, thus, potentially give rise to diastereomers and optical isomers. Unless stated to the contrary, the present invention includes all such possible diastereomers as well as their racemic mixtures, their substantially pure resolved enantiomers, all possible geometric isomers, and pharmaceutically acceptable salts thereof. Mixtures of stereoisomers, as well as isolated specific stereoisomers, are also included. During the course of the synthetic procedures used to prepare such compounds, or in using racemization or epimerization procedures known to those skilled in the art, the products of such procedures can be a mixture of stereoisomers.

Many organic compounds exist in optically active forms having the ability to rotate the plane of plane-polarized light. In describing an optically active compound, the prefixes D and L or R and S are used to denote the absolute configuration of the molecule about its chiral center(s). The prefixes d and l or (+) and (−) are employed to designate the sign of rotation of plane-polarized light by the compound, with (−) or meaning that the compound is levorotatory. A compound prefixed with (+) or d is dextrorotatory. For a given chemical structure, these compounds, called stereoisomers, are identical except that they are non-superimposable mirror images of one another. A specific stereoisomer can also be referred to as an enantiomer, and a mixture of such isomers is often called an enantiomeric mixture. A 50:50 mixture of enantiomers is referred to as a racemic mixture. Many of the compounds described herein can have one or more chiral centers and therefore can exist in different enantiomeric forms. If desired, a chiral carbon can be designated with an asterisk (*). When bonds to the chiral carbon are depicted as straight lines in the disclosed formulas, it is understood that both the (R) and (S) configurations of the chiral carbon, and hence both enantiomers and mixtures thereof, are embraced within the formula. As is used in the art, when it is desired to specify the absolute configuration about a chiral carbon, one of the bonds to the chiral carbon can be depicted as a wedge (bonds to atoms above the plane) and the other can be depicted as a series or wedge of short parallel lines is (bonds to atoms below the plane). The Cahn-lngold-Prelog system can be used to assign the (R) or (S) configuration to a chiral carbon.

Embodiments of the present disclosure will employ, unless otherwise indicated, techniques of chemistry, organic chemistry, chemical engineering, and the like, which are within the skill of the art. Such techniques are explained fully in the literature.

Before the embodiments of the present disclosure are described in detail, it is to be understood that, unless otherwise indicated, the present disclosure is not limited to particular materials, reagents, reaction materials, manufacturing processes, or the like, as such can vary. It is also to be understood that the terminology used herein is for purposes of describing particular embodiments only, and is not intended to be limiting. It is also possible in the present disclosure that steps can be executed in different sequence where this is logically possible unless the context clearly dictates otherwise.

Definitions

As used herein, "attached" can refer to covalent or non-covalent interaction between two or more molecules. Non-covalent interactions can include ionic bonds, electrostatic interactions, van der Waals forces, dipole-dipole interactions, dipole-induced-dipole interactions, London dispersion forces, hydrogen bonding, halogen bonding, electromagnetic interactions, π-π interactions, cation-π interactions, anion-π interactions, polar π-interactions, and hydrophobic effects.

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of.

As used in the specification and the appended claims, the singular forms "a," "an" and "the" include plural referents unless the context clearly dictates otherwise. Thus, for example, reference to "a unimolecular nanoparticle," "a nanocluster," or "a biomimetic vesicle," including, but not limited to, two or more such unimolecular nanoparticles, nanoclusters, or biomimetic vesicles, including combinations of unimolecular nanoparticles, nanoclusters, or biomimetic vesicles, and the like.

As used herein, "substantially free" can mean an object species is present at non-detectable or trace levels so as not to interfere with the properties of a composition or process.

DISCUSSION

In recent years, the demand for extraction of ions for mining and/or purification purposes from liquid substrates has increased. The increase in demand for ion extraction can be attributed, at least in part, to increased demand for various ions, including lithium, for use in the manufacture of important items such as batteries, as well as the increased efforts to reduce environmental pollution. Many current ion extraction or chelating techniques rely upon hazardous chemicals and/or are relatively expensive. As such, there exists a need for additional compositions and techniques for ion extraction, particularly for lithium ions.

With that said, described herein are methods of ion extraction that can include contacting a liquid ion source containing ions with an ion capture substrate in the presence of an organic solvent, where the ion capture substrate is composed of a plurality of polyethylenediimine moieties or a plurality of polymethylethylenediimine moieties, wherein each of the polyethylenediimine moieties or each of the polymethylethylenediimine moieties are covalently attached to an immbolization substrate. In some embodiments, the method is conducted under non-aqueous conditions. Also described herein are ion capture substrate s that can be composed of polymethylethylenediimine moieties. In some embodiments, the polymethylethylenediimine moieties can be attached to an immobilization substrate. Also described herein are chromatography columns that can include an ion capture substrate described herein. Other compositions, compounds, methods, features, and advantages of the present disclosure will be or become apparent to one having ordinary skill in the art upon examination of the following drawings, detailed description, and examples. It is intended that all such additional compositions, compounds, methods, features, and advantages be included within this description, and be within the scope of the present disclosure.

Ion Extraction Methods Using Octolig® Ligand or Methyl Derivatives Thereof

Described herein are methods of extraction ions from a source using Octolig® or a methyl derivative thereof. In some embodiments, the method can be selective for lithium ions. In one embodiment, the method is conducted under non-aqueous conditions. In this context, non-aqueous conditions refers to conditions that are substantially free of water. This can include but are not limited to, including solvents that are substantially free of water and non-aqueous phase liquids. In some embodiments, the method can include the steps of contacting a liquid ion source containing ions with an ion capture substrate in the presence of an organic solvent, where the ion capture substrate can include a plurality of polyethylenediimine moieties or a plurality of polymethylethylenediimine moieties. In one aspect of this embodiment, the plurality of polyethylenediimine moieties consists of Octolig®. In another aspect of this embodiment, the plurality of polymethylethylenediimine moieties consists of methyl Octolig®. The step of contacting can occur for 1 sec to 1 hour or more. In some embodiments the step of contacting can be 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60 second, minutes, or hours.

In some embodiments, each of the polyethylenediimine moieties or each of the polymethylethylenediimine moieties can be covalently attached to an immobilization substrate. In some embodiments, the immobilization substrate can be a silica gel. The ion capture substrate can be in any desired form, such as free or contained in a suitable container, such as packed in a chromatography column.

In some embodiments, the polyethylenediimine moiety can be according to Formula 1

—$CH_2CH_2NHCH_2NHCH_2CH_2$—  Formula 1.

In some embodiments, the polymethylethylenediimine moiety can be according to Formula 2

—$N(CH_3)CH_2CH_2N(CH_3)$—  Formula 2.

In some embodiments, the ion can be a metal ion. In some embodiments, the ions can include one or transition metal ions. In some embodiments, the ions can include lithium, sodium, potassium, magnesium, and combinations thereof. In some embodiments, the method can be selective for lithium ions. In some embodiments, the amount of lithium extracted from the source substrate can be greater than about 90, 91, 92, 93, 94, 95, 96, 97, 98, or 99 percent or more. In this context, "selective for lithium ions" can refer to the process resulting in a greater percentage of Lithium being extracted than one or more other ions.

In some embodiments, the organic solvent can be non-aqueous. In some embodiments, the organic solvent can be tetrahydrofuran (THF), ethers, esters, or a mixture thereof. In some embodiments, the organic solvent can be selected from the group of acetone, acetonitrile, butanone, 1,2-dichloroethane, diethylene glycol, diglyme (diethylene glycol dimethyl ether), 1,2-dimethoxyethane (DME), dimethyl formamide (DMF), dimethyl sulfoxide (DMSO), dioxane, ethyl acetate, ethylene glycol, methyl t-butyl ether (MTBE), N-methyl-2-pyrrolidinone (NMP), tetrahydrofuran (THF), toluene, and mixtures thereof. In one embodiment, the organic solvent can be THF.

The liquid ion source can be any suitable source material or substance that contains ions. In some embodiments, the liquid ion source can be non-aqueous. The liquid ion source directly contacted with the ion capture substrate is in a form suitable for ion removal by the capture substrate. For example, some reagents in synthetic chemical reactions or synthetic chemical reaction products are suitable for directly interacting with the ion capture material without further processing. In other aspects, the liquid ion source can be generated from raw ion source materials that require processing to obtain a liquid ion source suitable for ion capture via the methods and compositions described herein. Thus in some embodiments, the method can include the step of generating the liquid ion source from a raw ion source material via processing the raw ion source material using processing methods and techniques that will be appreciated by those of ordinary skill in the art. Such processing techniques will be dependent on, inter alia, the raw ion source material, and will be appreciated by those of ordinary skill in the art. Raw ion source materials can include, but are not limited to, any suitable water source (e.g. river/stream water, ground water, and drinking water), brine pools, brine deposits, geothermal brines and wells, synthetic chemical reactions waste products and/or water from factories, spent batteries and by-products of battery recycling and disposal. The methods described herein can be used to extract lithium and/or other ions directly from a liquid ion source or indirectly from a raw ion source for mining, reuse, recycling, and/or purification purposes. It will be appreciated that the liquid ion source can be a synthetic chemical reaction product or reagent. Thus, the method and ion capture substrates described herein can be used as an alternative to other ion chelating methods that are used during chemical reactions.

As the liquid ion source is contacted with the ion capture substrate, ions can become attached or otherwise associated with the ion capture substrate. In some embodiments, the ion capture substrate can be regenerated. In other words, the ions from the liquid ion source and captured by the ion capture substrate can be removed from the ion capture substrate such that the ion capture substrate can be reused. In some embodiments, the ion capture substrate can be regenerated by contacting the ion capture substrate with an acidic solution. In some embodiments, the acidic solution can be a dilute acidic solution. The ions can then move into the acidic solution and removed from the ion capture substrate. The ions can be removed from the acidic solution as desired and the ion capture substrate can be reused. In some embodiments, the ion capture substrate can be regenerated by contacting the ion capture substrate with a solution containing a ligand that has a greater affinity for one or more of the ions attached or otherwise associated with the ion capture substrate than the ion capture substrate. Because the affinity of the ions attached to or otherwise associated with the ion capture substrate is greater for the ligand, the ions disassociate from the ion capture substrate and associate or otherwise attach to the ligand to form a complex. Once the complex is formed, the complex and ions can be removed from the ion capture substrate to regenerate the ion capture substrate. In some embodiments, the ion capture substrate can be regenerated 1 to 10, 20, 30, 40, 50, 60, 70, 80, 90, 100, 200, or more times.

Methyl Derivatives of Octolig®

Described herein are methyl derivatives of Octolig®, which are not commercially available. In some embodiments, the methyl derivative is a polymethylethylenediimine. The methyl derivative of Octolig® can be according to Formula 2, shown above.

Also described herein, is an ion capture substrate that can be composed of a methyl derivative of Octolig®. In some embodiments, the ion capture substrate can be composed of a plurality of polymethylethylenediimine moieties. In some embodiments, each of the polymethylethylenediimine moieties is according to Formula 2. In some embodiments, each of the polymethylethylenediimine moieties can be covalently attached to an immobilization substrate. In some embodiments, the immobilization substrate can be a silica gel. The ion capture substrate can be in any desired form, such as free or contained in a suitable container, such as packed in a chromatography column.

Also described herein are containers, such as chromatography columns, that can contain a plurality of polymethylethylenediimine moieties as described herein. In some embodiments, each of the polymethylethylenediimine moieties is according to Formula 2.

In some embodiments, the polymethylethylenediimine moieties are covalently attached to an immobilization substrate. In some embodiments, the immobilization substrate is a silica gel or other immobilization substrate described herein.

The ion extraction compositions described herein can be used a variety of applications, including water purification and/or recovery/extraction of Lithium and/or other ions from ground water, drinking water, brine pools, brine deposits, and/or geothermal brines and/or wells. The ion capture substrates (both Octolig® and its methyl derivatives) described herein can be used during chemical synthesis to extract ions from a reagent, reaction, and/or product as desired Thus, the ion capture substrates described herein can be used as an alternative to other ion chelating compositions and/or techniques that are used during chemical reactions. The ion capture substrates (both Octolig® and its methyl derivatives) described herein can be used in the process of capturing Li ions from used or spent batteries and other devices incorporating lithium.

EXAMPLES

Now having described the embodiments of the present disclosure, in general, the following Examples describe some additional embodiments of the present disclosure.

While embodiments of the present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure. The following examples are put forth so as to provide those of ordinary skill in the art with a complete disclosure and description of how to perform the methods and use the probes disclosed and claimed herein. Efforts have been made to ensure accuracy with respect to numbers (e.g., amounts, temperature, etc.), but some errors and deviations should be accounted for. Unless indicated otherwise, parts are parts by weight, temperature is in ° C., and pressure is at or near atmospheric. Standard temperature and pressure are defined as 20° C. and 1 atmosphere.

Example 1

Introduction

Lithium has had a notably dull history until comparatively recently. As a subject of a graduate level course "Chemistry of the Less-familiar Elements," Element 3 rated ten pages in an early textbook.[1] One interesting use was as a mood-stabilizing drug agent in the management of the manic-depressive syndrome, the most common mental disorder after schizophrenia.[2]

Koener[3] noted some years ago the practical status of lithium and lithium compounds when he accurately stated "Until recently lithium was a minor commodity." The major uses in addition to use as a drug was in manufacture of glass and grease. But as he accurately added the demand increased profoundly as Blackberries and iPods became so popular. And between 2003 and 2007 manufacturing of batteries doubled the consumption of lithium carbonate.[3] Li-ion batteries are presently exceedingly important to plans that automobile industries may have to leave fossil fuels. As such, reliable and inexpensive sources of lithium are desirable.

Though the western United States have mineral sources of lithium minerals (spodumine and pegmatite), a truly major source is in Chile. One ancient lake bed, Salar de Atacama contains over 25% of the world's reserve base of lithium.[3]

This Example is concerned with the possibility that a Octolig® or a methylated derivative of Octolig®[4,5] might be useful in the removal or capture of lithium ion, while using a common organic solvent (THF). N, N'-tetraethyl-ethylenediamine (TEEDA) was used to inhibit the action of LiCl in one step of a chemical reaction sequence. It was hypothesized that the chelating agent formed a chloride-bridged dimer [TEEDLiCl$_2$TEED].[6]

In this Example, the ion removal (e.g. LiCl) by methylated Octolig® is examined. The proposed structure of Octolig® has a moiety, viz.,

—CH$_2$CH$_2$NHCH$_2$NHCH$_2$CH$_2$— (Formula 1)

moieties that are immobilized on a silica gel. Its alkylation with methyl iodide could emulate TEED. In this Example, column chromatography using Octolig® or methylated derivative as the substrate was characterized, inter alia.

The number of coordination sites was determined by measuring the uptake of iron(II) and assuming that two nitrogen atoms were generally associated with each iron(II) ion. This assumption serves as a working hypothesis to calculate the amount of methyl iodide needed to alkylate Octolig® on a "1:1 basis" or on a "0.5:1 basis"

Materials and Methods

Sources of Reagents and Materials

Octolig® which is immobilized polyethylenediimine moieties covalently attached to high-surface-area silica gel (CAS Registry number=404899-06-5) was a gift from Metre-General, Inc. (3771 Monarch St, Unit A, Frederick, Colo. 80530) and was used as received. Lithium chloride (Sigma-Aldrich. P.O. Box 14508, St Louis, Mo. 63178) was used as received. Methyl iodide (99% stabilized), obtained from Arcos Organics (Janssen Pharmaceutics, 1 Reagent Lane, Fairlawn, N.J. 04410), was used as received. Triethyl amine (Arcos Organics: Janssen Pharmaceutics 1 Reagent Lane, Fairlawn, N.J. 04410) was redistilled (b.p. 88° C.) just prior to use, except for a fresh unopened bottle. Tetrahydrofuran (Jassen Pharmaceutics) was typically redistilled before use unless a fresh sample was available.

Synthesis

Several synthesis methods were used and are briefly described herein.

Version I;

A suspension of 60 g of Octolig® (ca 130 mL) and 60 mL (0.55 mole) of freshly redistilled triethyl amine in 600 mL beaker was placed in an ice-water bath in a hood. The mixture was treated dropwise with a of methyl iodide (70 g 0.49 mole) in 50 mL of THF with stirring to ensure that the temperature of the exothermic mixture remained between 20-25° C. The Octolig® started to become pale yellow at about one-third of the 45 min addition time. The solid product was washed thoroughly until no colored material was removed. Then the mixture was poured into a plastic funnel with the bottom end covered with mesh (1000µ, Nylon macro filtration, Spectrum Medical Industries, Los Angeles, Calif. 900540) held in place with a small radiator clamp. When the sample was placed in chromatography column, it was washed additionally with DI water.

Version II:

Methyl iodide (137 g, 0.96 mole) in 50 mL of THF was added dropwise to a mixture of 60 g of Octolig® and triethylamine (0.70 mole), in about 100 mL of THF. A New Brunswick Model 26 shaker bath (Edison, N.J.) provided agitation of the mixture (setting 6: =<170 rpm) and an ice-water mixture maintained temperature at less than 20° C. Also, the separatory funnel used to add the methyl iodide solution was covered with aluminum foil to minimize light-assisted decomposition of methyl iodide. The reaction was effected in one hour, and a nearly white product resulted following thorough washing with DI water.

Column Separation Attempts with Octolig®

Aqueous samples of lithium chloride (Sigma, P.O. Box 14508, St. Louis, Mo. 63178) were prepared and subjected to column separation as previously described.[5-9] A Spectra/chron peristaltic pump was used to deliver aqueous samples to a CHEMGLASS chromatography column, 2 cm (id), 30 cm in length and equipped with a glass frit and a Teflon stopcock. The column was packed with a known volume of Octolig® resulting in a void volume of 44%. The substrate had been washed with DI water, and the supernatant, which contained fines, was decanted and discarded. The procedure was repeated until no fines were noticed, then the column was packed with the washed Octolig®.

Water samples containing Li$^+$ (as noted in Table 1) were passed over the packed substrate using a rate of about 10 mL/min, but prior to hookup, a 50 mL sample was collected and discarded. Usually, the first three or four 50 mL aliquots of effluent were discarded, and later ones were used for analysis (Table 1). The discard procedure was a recognition of the consequences of sending a standard solution into a void volume filled with DI water.

Column Separation—(Version I) Methyl Octolig®

The same synthesis procedure Version I was used but using methyl Octolig® instead. The observed void volume was slightly less (37% vs. 44%) for Octolig® as compared to methyl Octolig®.

Batch-Separation Method—(Version II) Methyl Octolig®

A 100-mL sample (ca. 1000 ppm as LiCl) was used as the control sample and a second 100-mL sample was used as the test system. The test sample of LiCl in THF was shaken with 0.5 methyl Octolig® (50 mL, 31.2 g) using the New Brunswick Model G76 Shaker Bath at rate of 240 rpm for a two-hour period, in accord with an earlier study.[12] The sample was filtered through fluted filter paper (802 fluted sleeve; Whatman, Inc; Clinton, N.J.), and the filtrates of test and control samples were allowed to evaporate to dryness in an open hood. Then, the residues were dissolved in a known volume (20 mL) of DI water, and submitted for analysis.

Akali Metal Ion Competition Study

An equimolar (0.24 mmoles) mixture of lithium chloride (0.1020 g), sodium chloride (0.1610 g), and potassium chloride (0.1894 g) were prepared and dissolved/suspended in a liter in THF. Thus, lithium chloride was present in 1.0 w/w ratio, NaCl in 1.38 w/w ratio, KCl in 1.76 w/w ratio. Materials were placed in 1 L of THF, but out of a 0.4424 g mixture, 0.1993 was not dissolved. The "Batch Separation Method," was used to provide the Test sample, e.g., a mixture of 250 mL of solution was mixed with 50 mL of Octolig® in a 1 L Erlenmeyer flask. Shaking was continued for 45 minutes at 240 rpm. Control and filtered test samples (250 mL each) were separately evaporated to dryness, dissolved in 20 mL of DI water, and submitted for analysis. Results in Table 5 are averages of analyses in triplicate. A control experiment using 50 mL of Octolig® in 1 L of THF was run to test whether Octolig® contained any sodium ion that would be released into THF.

pH and TDS

Analyses of pH and TDS (total dissolved solids) were performed using a Hanna Instruments, Inc. (584 Park East Drive, Woonsocket, R.I.) H19813-6 pH/EC/TDS/temperature meter with a multi parameter probe using appropriate standards.

Lithium Analyses

These were performed by the Analytical Services Laboratory of Constellation Technology (Largo, Fla.) using ICP-AES for the samples listed in Table 1 and ICP OES (AL0025) for the data in Tables 2-5.

Results and Discussion

The results presented in Table 1 can indicate that the removal of aqueous lithium ion by Octolig® is slight at best. Possibly this might be expected from the statement from the producers of Octolig®, e.g., that this material did not coordinate common alkali metal ions. It was stated that "The cations of sodium, potassium, and calcium and magnesium are not complexed and retained by Octolig®. Since these elements are not harmful in waste streams, not removing them is an advantage because all of the metal removing capacity of the Octolig® is retained for heavy metals."[4] Nothing was said about lithium ion, which tends to be unique, owing to the ionic size and as reflected in a heat of hydration that is unique among alkali metal ions.[12]

Accordingly, Octolig® was methylated in an effort to form moieties, e.g.,

—N(CH$_3$)CH$_2$CH$_2$N(CH$_3$)— (Formula 2)

(methyl Octolig) with details given in the Experimental section above. The study was repeated but with analysis of separate 50-mL fractions rather than composite fractions (Table 2). These results for the 1:1 product showed no discernable removal. In addition, the 0.5:1 alkylation procedure also did not show a successful removal (Table 3). It may be concluded that removal of lithium ion from aqueous solution was not achieved, nor was it likely to be, at least by the techniques used in this Example.

Also, it is useful to remember that Walsh and colleagues[6] in their report on N, N'-tetraethylethylenediamine (TEEDA) inhibition of the action of LiCl were using non-aqueous conditions, e.g., methyl tertiary-butyl ether (MTBE), and when lithium ion is involved the choice of solvent can be a serious consideration. Lithium ion, as Moeller[12] noted, has a significant heat of hydration, e.g., the value 123 kcal/per mole[12] is significantly greater than the other alkali metal ions (Na$^+$, 97; K$^+$, 77; Rb$^+$, 70; or Cs$^+$, 63 kcal/mole).[12] The energy of displacement of water molecules from lithium ion by Octolig® would be energetically challenging, and an alternative approach would be necessary for success. As can be demonstrated by at least this Example and discussion elsewhere herein, alternative approaches can include, but are not limited to, structural modifications or use of a non-aqueous solvent.

The methyl tert-butyl ether used by Walsh and co-workers [6] was not used in this Example because this material, formerly used as anti-knock agent in gasoline has been recognized as a teratogen.[13] Tetrahydrofuran was determined to be an acceptable substitute, due to its structure and availability.

Using water as a solvent, no lithium removal was observed, whereas using THF as a solvent resulted in significant removal (greater than or equal to about 99%) (Table 4). The significant Li+ ion removal with THF as a solvent held not only with methyl Octolig®, but with Octolig® as well. No previous work resulted in the successful removal of lithium ion by Octolig®, but the use of an organic solvent, such as THF surprisingly overcame the problems associated with the high affinity of lithium ion for water. Further, the results with methyl Octolig® can suggest a useful approach in organic synthesis for lithium removal, e.g., providing an alternative method for elimination of a lithium-chelating reagent by substituting a lithium-chelating reagent with solid Octolig®, which has advantages over traditional lithium-chelating reagents. Indeed Octolig® is significantly cheaper (about $40 per kg) and can be recycled. This is in contrast to TEED, which requires complicated disposal practices and MTBE, which is teratogenic and thus presents a significant health hazard.

It is believed that the present Example describes and demonstrates a useful and previously unknown property of Octolig® and the methyl Octolig® that was generated. Further, this Example can demonstrate the potential usefulness of these ligands for various organic synthesis application and extraction of lithium and other ions from spodumene or pegmatite sources found in western United States.[1]

More recently another source as been described, e.g., lithium from geothermal brines.[15] Hot geothermal lakes exit underground at high pressure, and when pumped to the surface provide a source of a "flash-stream" at temperatures near 325° C. This temperature is sufficient for generating power. In addition, the streams contain a variety of salts that could be removed by a three-stage bench-scale column extraction process that used, as a sorbent, lithium/aluminum layered double hydroxide intercalated by chloride (Li/Al LDH-Cl); they had synthesized and characterized. These researchers reported a 91% recovery efficiency and excellent selectivity for lithium, relative to sodium and potassium was reported.[14]

The possibility of selective lithium separation with Octolig® was tested using a mixture of lithium, sodium, and potassium chlorides (Table 5). Quantitative removal was achieved for lithium (99.6%), less for sodium (82%) and much less for potassium (38.3%).

Geothermal brines are used as a source of heat,[14] but they also represent a problem of disposal. The water could be separated from the dissolved solids, so the separated solid fraction could be used as a source of lithium upon enrichment of the resulting "ore" with Octolig®, and/or methyl Octolig®. Some areas have significant lithium ion concentrations, such as a Salton Sea geothermal brine that was described as having 270 ppm Li.[15] Thus, the Octolig® and/or methyl Octolig® can be useful to extract lithium from these sources as well.

REFERENCES FOR EXAMPLE 1

[1] Hopkins B S. *Chapters in the Chemistry of the Less Familiar Elements*, 1938, vol 1, chapter 2 pp 3-13.
[2] Doig, M. T. III; Heyl, M. G.; Martin, D. F. Lithium and mental health J. Chem. Educ., 1973 50, 343-344.
[3] Koerner, B. I. Energy and genius. The Saudi Arabia of lithium. Forbes, Nov. 24, 2008.
[4] Alldredge, R. Tomorrow's solution today. Metre-General, Inc., P.O. Box 1149, Frederick, Colo. 80530 nd.
[5] Martin, D. F. Chromatographic separations with selected supported chelating agents, *In Column Chromatography Martin*, D. F.; Martin, B. B., Eds, InTech Europe, Rijeka, Croatia.
[6] Salvi, L; Jeon, S.-J.; Fisher, E. L.; Carroll, P. J.; Walsh, P. J. Catalytic asymmetric generation of (Z)-disubstituted allylic alcohols. J. Am. Chem. Soc., 2007, 129, 16119-16125.
[7] Stull, F. W.; Martin, D. F. Comparative ease of separation of mixtures of selected anions (nitrate, nitrite, sulfate, phosphate) using Octolig®. J. Environ. Sci. Health., Pt. A, 2009, 44, 1551-1556.
[8] Martin, D. F.; Kondis, N. P.; Alldredge, R. L. Effectiveness of removal of aqueous perchlorate by Cuprilig, a copper(II) derivative of Octolig® J. Environ. Sci. Health. Pt.A, 2009, 44, 188-191.
[7] Chang, W.-S.; Martin, D. F.; Small, M. Use of model compounds to study removal of pharmaceuticals using Octolig® Technol. Innov., 2010, 12, 71-77.
[9] Martin, D. F.; Alessio, R. J.; McCane, C. H. Removal of synthetic food dyes in aqueous solutions by Octolig®, J. Environ. Sci. Health Pt. A. 2013, 48, 495-500.
[10] Martin, D. F., Sehgal, T.; Word, T. A. Removal of pain-relieving drugs from aqueous solutions using Octolig® and metalloligs. J. Environ. Sci. Health, Pt. A., 2015, 50, 788-793.
[11] Martin, D. F.; Mojarena Martin, J.; Word, T. A. Removal of selected NSAIDs (nonsteroidal anti-inflammatory drugs) in aqueous samples by Octolig®. J. Environ. Sci. Health, Pt. A., 2016, 51, 186-191.
[12] Moeller, T. *Inorganic Chemistry*, John Wiley & Sons, Inc. New York 1952; p. 819.
[13] Anon. methytertiarybutyl ether is now "banned" as a fuel additive in the United States. Wikepedia. [Accessed: Jan. 3, 2018].
[14] Paranthaman, M. P.; Li, L.; Luo, J.; Hoke, T.; Ucar. H.; Moyer, B. A.; Harrison, S. Recovery of lithium from geothermal brine with lithium-aluminum layered double hydroxide chloride sorbants. Environ. Sci. Technol. 2017, 51, 13481-13486.
[15] L. E. Schultze and D. J. Bauer, "Operation of a mineral recovery unit on brine from the Salton Sea known geothermal resource area," US Bureau of Mines, Report of Investigations 8680, 1982.

Tables for Example 1.

TABLE 1

Results of analyses of samples of aqueous lithium salts passed over a chromatography column packed with about 90 mL of Octolig ® at a rate of 10 mL/min with 50-mL fractions collected.

| Lithium Compound | Medium | Sample | Fractions | Li, ppm | % Removed |
|---|---|---|---|---|---|
| LiNO$_3$ | DI water | Stock | — | 62.1 | |
| | | Composite | 5-7 | 61. | 1.6 |
| LiCl | Well water | Stock | | 79.7 | |
| | | Composite | 7-9 | 78.9 | 1.0 |

TABLE 2

Results of analyses of samples of aqueous lithium chloride passed over a chromatography column packed with (1:1) methylated Octolig ® ligand at a rate of 10 mL/min with 50-mL fractions collected.

| Fraction | pH | TDS ppm | Li, ppm | % Removal |
|---|---|---|---|---|
| Stock-1 | 5.6 | 370 | 31.85 | |
| Stock 2 | 6.1 | 367 | 31.94 | |
| 4 | 5.4 | 332 | 31.96 | — |
| 5 | 5.5 | 346 | | |
| 6 | 5.4 | 355 | 31.86 | — |
| 7 | 5.0 | 345 | | |
| 8 | 5.0 | 346 | 31.96 | — |

TABLE 3

Results of analyses of samples of aqueous lithium chloride passed over a chromatography column packed with (0.5:1) methylated Octolig ® ligand at a rate of 10 mL/min with 50-mL fractions collected.

| Fraction | pH | TDS ppm | Li, ppm | % removal |
|---|---|---|---|---|
| Stock | 7.00 | 177 | 14.69 | |
| 3 | 6.3 | 143 | 14.64 | — |
| 4 | 5.6 | 123 | | |
| 5 | 5.8 | 128 | 15.05 | — |
| 6 | 5.7 | 134 | | |
| 7 | 5.7 | 134 | 14.38 | — |

TABLE 4

Analyses of samples containing lithium ion in THF shaken with Octolig ® ligand and derivatives.

| | Substrate | Concentration, ppm | | |
|---|---|---|---|---|
| Li sample | sample | Initial | Final- | % Removal |
| — | LiCl | Octolig ® | 818 | 4.9 | 99.4 |
| | LiCl | | 818 | 2.1 | 99.7 |
| | | MeOctolig ® | | | |
| | LiCl | I, Version I | 563 | 55 | 91.2 |
| | LiCl | III, Version II | 679 | 36.1 | 94.7 |

TABLE 5

Analyses of alkali metal ions in THF shaken with Octolig ® ligand.

| Sample | Concentrations mg/L | | |
|---|---|---|---|
| | Li | Na | K |
| Control | 181 | 15.6 | 15.4 |
| Test | 0.6 | 2.8 | 9.5 |
| Removal | 99.6% | 82.4% | 38.3% |

NB. The final concentration for a blank, Octolig ® ligand only, run was 0.3 ppm

We claim:

1. A method of extracting lithium ions from an organic solvent, the method comprising:
   providing a liquid ion source containing lithium ions and an organic solvent selected from the group consisting of acetone, acetonitrile, butanone, 1,2-dichloroethane, diethylene glycol, diglyme (diethylene glycol dimethyl ether), 1,2-dimethoxyethane (DME), dimethyl formamide (DMF), dimethyl sulfoxide (DMSO), dioxane, ethyl acetate, ethylene glycol, methyl t-butyl ether (MTBE), N-methyl-2-pyrrolidinone (NMP), tetrahydrofuran (THF), toluene, and mixtures thereof, wherein the liquid ion source is substantially free of water;
   contacting said liquid ion source with an ion capture substrate, wherein the ion capture substrate comprises a plurality of polyethylenediimine moieties, each of the plurality of polyethylenediimine moieties having the formula —$CH_2CH_2NHCH_2NHCH_2CH_2$—, or a plurality of polymethylethylenediimine moieties, each of the plurality of polymethylethylenediimine moieties having the formula —$N(CH_3)CH_2CH_2N(CH_3)$—, wherein each of said moieties are covalently attached to an immobilization substrate, and adsorbing the lithium ions onto said moieties; and
   removing the ion capture substrate with the lithium ions adsorbed thereon from the organic solvent.

2. The method of claim 1, further comprising the step of regenerating the ion capture substrate by removing the adsorbed lithium ions from the polyethylenediimine moieties or the polymethylethylenediimine moieties on the ion capture substrate.

3. The method of claim 2, wherein the step of regenerating comprises contacting the ion capture substrate with an acidic solution or a solution comprising a ligand having a greater affinity for the lithium ions captured by the ion capture substrate than the ion capture substrate.

4. The method of claim 1, wherein the method is selective for the lithium ions.

5. The method of claim 1, wherein greater than about 90 percent of the lithium ions present in the liquid ion source are adsorbed on the ion capture substrate and removed from the liquid ion source.

6. The method of claim 1, wherein the immobilization substrate is a silica gel.

* * * * *